May 3, 1966  J. A. VAN BERGEN ETAL  3,249,276
ELECTRIC ARC WELDING APPARATUS
Filed Oct. 27, 1964

INVENTOR.
JAN A. VAN BERGEN
CORNELIS P. DE JONG
BY

AGENT 3,249,276
ELECTRIC ARC WELDING APPARATUS
Jan Anthonie van Bergen and Cornelis Pieter de Jong, both of Emmasingel, Eindhoven, Netherlands, assignors to North American Philips Company, Inc., New York, N.Y., a corporation of Delaware
Filed Oct. 27, 1964, Ser. No. 406,839
Claims priority, application Netherlands, Nov. 15, 1963, 300,571
3 Claims. (Cl. 226—174)

The invention relates to an electric arc welding apparatus comprising a supply reel for the wire- or tape-shaped welding electrode wound thereon and to be wound off, a guide having an opening for guiding the electrode wound off the supply reel and at least three orientation rollers and a driving or propelling mechanism for the electrode having at least one pair of rollers co-operating with the electrode and being arranged for pulling the electrode through the orientation rollers and into a tubular passage preceding a welding nozzle or welding torch.

The known apparatus of this kind involves difficulties such as considerable wear of the guide opening through which the electrode is passed to the orientation rollers, and the risk of slipping and of damage to the electrode between the driving rollers or propelling members and difficulty of inserting or threading of the electrode through the apparatus, for example, after exchanging a supply reel.

The invention has for its object to obviate or at least to minimize these difficulties.

In accordance with the invention the orientation rollers are disposed relative to both the inlet guide opening and to the rollers of the driving or propelling member so that the electrode passes through the inlet guide opening substantially without friction and the electrode is orientated entirely or substantially entirely by the orientation rollers.

In one embodiment of the invention the orientation rollers and the inlet opening are located on a common support which is adjusted both relative to the supply reel and to the driving or propelling member.

A preferred embodiment is characterized in that the rotary axis of the supply reel is located on one side of the plane defined by the common tangential plane of the driving rollers and the centre line of the inlet opening is located on the other side of said plane, and the first orientation roller after the inlet opening is intersected by said plane but is remote or, at the most, touched by said centre line of the inlet opening. Also, said tangential plane intersects the second orientation roller after the inlet opening, while the axis of rotation of the first and the second orientation rollers lying on opposite side of said tangential plane and further said tangential plane is spaced a distance from the third orientation roller, the axis of rotation of which is located on the same side of said tangential plane as the centre line of the first orientation roller.

The invention is based on the recognition of the fact that by a correct adjustment and disposition of the orientation rollers the aforesaid disadvantages can be obviated wholly or for the major part.

The invention will be described more fully with reference to the drawing.

Figure 1:
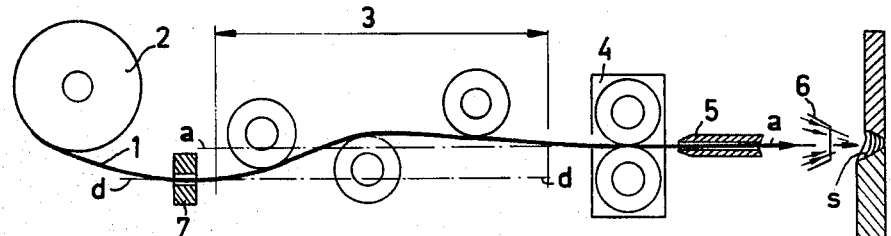
FIG. 1 shows diagrammatically the disposition of the main parts of a welding apparatus and the plane and center line referred to above according to the invention.

By way of example FIG. 1 shows diagrammatically an arrangement for semi-automatic, electric arc welding in a protective gas. The wire-driving mechanism 4 unwinds a welding wire 1 from a supply reel 2 and draws it through a contact tube 5, where the electric energy required for melting the welding wire is applied and a nozzle or torch 6, where the protective gas is supplied, to the melting pool S. From this figure it will be seen that the driving mechanism 4 is preceded by a wire orientating member 3, the function of which will be described hereinafter. This wire orientating device comprises at least three orientation rollers.

When the welding wire 1 is being wound onto the reel 2, it is subjected to such a plastic deformation that during the welding operation the welding wire can be uniformly wound off the reel without one or more turns of the wire loosening themselves in varying intervals and hence without fluctuation of the speed of rotation of the reel.

For practical reasons the welding wire should travel along a substantially straight line through the driving mechanism 4 and the contact tube 5 towards the melting pool S. Heretofore the form in which the welding wire leaves the reel, it does not measure up to this requirement, since it tends to assume a strongly curved shape.

It is the function of said wire orientating member 3 to deform the welding wire plastically so that in a state of rest its shape approaches substantially that of a straight line. This plastic deformation provided by the orientation member is the reflection of that to which the welding wire is subjected upon winding onto the reel.

Figure 2:
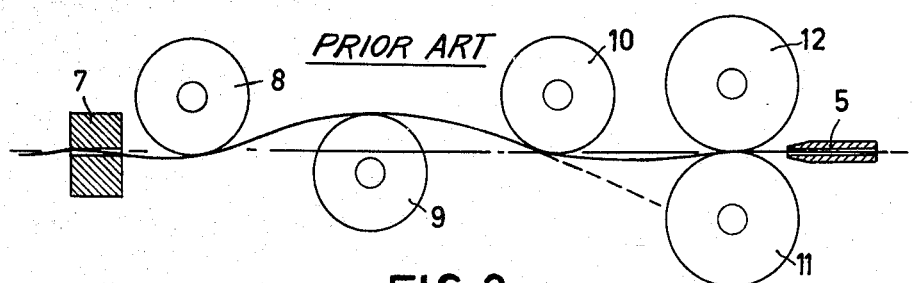
FIG. 2 shows diagrammatically the conventional or prior art disposition of the orientation members relative to the rollers of the driving or propelling member and to the inlet opening leading to the orientation rollers.
Figure 3:
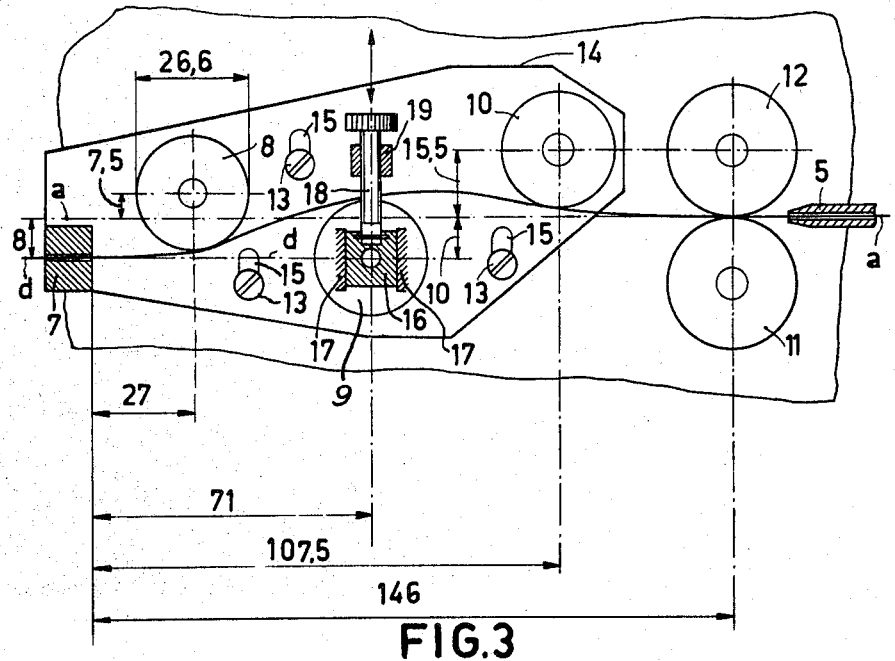
FIG. 3 shows a preferred arrangement of the orientation rollers, which is improved in accordance with the invention.

As shown in FIGS. 2 and 3 the welding wire 1 being unwound from the reel is guided through an opening in an inlet tube 7 towards the orientation rollers 8, 9 and 10. The welding wire passes along the orientation rollers 8 and 10 on their lower side and a vertically adjustable orientation roller 9 on its upper side, after which it is propelled by the driving rollers 11 and 12 towards the contact tube 5. From FIG. 2 it appears that the welding wire is subjected in the sleeve 7 to a comparatively large angular bending, which results unavoidably in high frictional losses. Furthermore the welding wire is bent over excessively by the orientation roller 10 (see the broken line), which requires that the driving rollers must contribute to the orientation proper of the welding wire.

In the arrangement according to the invention (FIGS. 1 and 3) these disadvantages are obviated. In this case the welding wire passes through the sleeve 7 without heavy frictional losses, since it is subjected in the sleeve only to very slight transverse forces. The required plastic deformation of the welding wire is performed in the orientation device itself, so that the overall frictional losses are reduced, since the coefficient of the rolling friction (of the orientation rollers) is considerably smaller than the coefficient of the sliding friction (in the passing sleeve). Moreover, the welding wire leaves the orientation member after the roller 10 at a more favourable angle, so that in this case the driving rollers 11 and 12 need scarcely perform an additional orientational function. In the arrangement shown in FIG. 3 the welding wire is orientated more effectively than in the arrangement of FIG. 2, whereby the welding wire enters the sleeve 5 automatically and the driving rollers 11 and 12 need exert a proportionally smaller longitudinal force on the welding wire in order to attain the desired speed of feeding of the welding wire. Moreover, the risk of slipping and damage of the welding wire between the driving rollers is thus strongly reduced.

A further advantage is found in the insertion or threading of the welding wire, for example after replacing the supply reel 2. Since the sleeve 7 and the orientation roller 9, as is shown in FIG. 3, occupy a lower position relative to the orientation rollers 8 and 10 than in FIG. 2, the insertion of the welding wire in the arrangement according to the invention between the various rollers can be performed more easily than in the other arrangement.

From FIG. 3 it is also seen that the rollers 8, 9, 10 of the orientation member for the wire, together with the sleeve 7 are arranged on a common support 14, which is secured by screws or bolts 13 in holes 15 of the housing of the welding apparatus. The holes 15 may, if desired, be elongated holes to provide adjustment.

The roller 9 is supported in a bearing 16, which can be displaced in a direction of height along guides 17 by means of an adjusting member 18, 19, shown diagrammatically. This adjusting member is provided on the support 14.

FIG. 3 is drawn intentionally on a scale of 1:1 and the measures for the adjustment of a welding wire having a diameter of 1.2 mm. are indicated in the figure.

For orientating a wire having a diameter of 0.9 mm., the axis of roller 9 should be placed at a level 1.8 mm. higher than for the 1.2 mm. wire and for orientating a wire having a diameter of 1.6 mm., the roller 9 is displaced over 1 mm. in a downward direction from its position for a 1.2 mm. wire.

From FIG. 2 it will be seen that in the conventional arrangement the centre line of the wire guiding sleeve 7 is located in the common tangential plane to the rollers 11 and 12 of the propelling or driving member.

In the improved arrangement according to the invention (FIGS. 1 and 3) the centre line d—d of the guide opening in the sleeve 7 is located at a distance of 8 mm. from said common tangential plane a—a.

The first orientation roller 8, in contrast to the arrangement of FIG. 2, is intersected by the tangential of feeding plane a—a and is not intersected or is at the most touched by the guiding plane d—d. The feeding plane a—a intersects the second orientation roller 9. The rotational axis of the first orientation roller 8 and of the second orientation roller 9 are located on either side of the feeding plane a—a. The feeding plane a—a is located at a small distance from the wire contacting surface of the third orientation roller 10, and the rotational axis of this roller is located on the same side of the feeding plane a—a as the centre line of the first orientation roller 8.

What is claimed is:

1. Apparatus for electric arc welding comprising an assembly including a supply reel having a welding electrode wound thereon, a welding nozzle remote from said reel and means for guiding, orienting and feeding said electrode to said welding nozzle, inlet means having an opening for receiving said electrode from said supply reel for guiding said electrode into said orientation means, said orientation means having three axially spaced orientation rollers, means connected with said orientation means for locating said orientation rollers relative to the guiding plane of said opening and the feeding plane of said feeding means, said guiding plane and said feeding plane being offset relative to one another, the axis of said supply reel being positioned on one side of said feeding plane and the axis of said opening on the opposite side of said feeding plane, said rollers straddling said feeding plane for passing said electrode through said opening with a minimum of friction and supplying said electrode to said feeding means substantially on said feeding plane.

2. Apparatus according to claim 1 wherein each of said orientation rollers and said inlet means are connected with a plate member, and means connected with said assembly for adjustably moving said plate member relative to said reel axis and said feeding plane.

3. Apparatus according to claim 2 wherein the first of said orientation rollers following said inlet in the direction of movement of said electrode is positioned for intersection with said feeding plane, said second orientation roller following said inlet means being intersected by said feeding plane and said guiding plane, the axis of rotation of said first and second rollers being located on opposite sides of said feeding plane; said third orientation roller being remote from both said feeding and guiding planes and having its axis of rotation on the same side of said feeding plane as said first orientation roller.

References Cited by the Examiner

UNITED STATES PATENTS

| | | | |
|---|---|---|---|
| 2,400,739 | 5/1946 | Burge | 242—54 |
| 3,119,948 | 1/1964 | Baird | 219—130 |
| 3,172,992 | 3/1965 | Keller | 219—130 |

ROBERT B. REEVES, *Primary Examiner.*

J. N. ERLICH, *Assistant Examiner.*